United States Patent
Joko et al.

(10) Patent No.: US 10,048,442 B2
(45) Date of Patent: Aug. 14, 2018

(54) REINFORCEMENT DEVICE FOR OPTICAL-FIBER SPLICED SECTION

(71) Applicant: SEI Optifrontier Co., Ltd., Yokohama-shi, Kanagawa (JP)

(72) Inventors: Kazufumi Joko, Yokohama (JP); Ryosuke Meo, Yokohama (JP); Makoto Miyamori, Yokohama (JP); Toshihiko Homma, Yokohama (JP)

(73) Assignee: SEI Optifrontier Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/114,590

(22) PCT Filed: Nov. 26, 2014

(86) PCT No.: PCT/JP2014/081233
§ 371 (c)(1),
(2) Date: Jul. 27, 2016

(87) PCT Pub. No.: WO2015/114927
PCT Pub. Date: Aug. 6, 2015

(65) Prior Publication Data
US 2016/0341898 A1    Nov. 24, 2016

(30) Foreign Application Priority Data
Jan. 28, 2014   (JP) ................. 2014-013687

(51) Int. Cl.
*G02B 6/25*  (2006.01)
*G02B 6/255*  (2006.01)

(52) U.S. Cl.
CPC .......... *G02B 6/2558* (2013.01); *G02B 6/255* (2013.01)

(58) Field of Classification Search
None
See application file for complete search history.

(56) References Cited

U.S. PATENT DOCUMENTS 4,274,707 A * 6/1981 Pacey ................. G02B 6/2551
219/121.58
5,434,387 A * 7/1995 Haley .................. B29B 13/024
156/296

(Continued)

FOREIGN PATENT DOCUMENTS

JP   S58-23006 A    2/1983
JP   S59-229312 A   12/1984

(Continued)

*Primary Examiner* — Tina Wong
(74) *Attorney, Agent, or Firm* — Drinker Biddle & Reath LLP (57) ABSTRACT

This reinforcement device includes: a first heater (9A) on which a fusion-spliced section of an optical fiber covered with a protective member is disposed and which heats a central portion of the protective member at a first temperature (T1); second heaters (9B) which are respectively provided on both sides of the first heater (9A) along a longitudinal direction of the optical fiber and respectively heat both end portions of the protective member at a second temperature (T2); and a CPU (14) which performs energization control for heating each of the first heater (9A) and the second heaters (9B), wherein the CPU (14) makes an energizing time of the first heater (9A) and an energizing time of each of the second heaters (9B) at least partially overlap.

10 Claims, 10 Drawing Sheets

(56) References Cited

U.S. PATENT DOCUMENTS

| | | | |
|---|---|---|---|
| 6,437,299 B1 | 8/2002 | Watanabe et al. | |
| 2005/0123253 A1 | 6/2005 | Sato | |
| 2006/0280417 A1* | 12/2006 | Sato | G02B 6/2551 |
| | | | 385/134 |

FOREIGN PATENT DOCUMENTS

| | | |
|---|---|---|
| JP | H02-73602 U | 6/1990 |
| JP | H04-24705 U | 2/1992 |
| JP | H07-198981 A | 8/1995 |
| JP | 3293594 B2 | 6/2002 |
| JP | 2005-148170 A | 6/2005 |
| WO | WO-92/02355 A1 | 2/1992 |

* cited by examiner

REINFORCEMENT DEVICE FOR OPTICAL-FIBER SPLICED SECTION

TECHNICAL FIELD

The present invention relates to a reinforcement device which reinforces a spliced section where optical fibers are spliced to each other.

BACKGROUND ART

In the related art, there is a reinforcement device which reinforces a fusion-spliced section where optical fibers are fused to each other by an electric discharge with end faces brought into contact with each other, by covering the fusion-spliced section with a tube made of heat-shrinkable resin and heat-shrinking the tube (refer to PTLs 1 to 3).

CITATION LIST

Patent Literature

[PTL 1] Japanese Patent No. 3293594
[PTL 2] JP-UM-A-4-24705
[PTL 3] JP-UM-A-2-73602

SUMMARY OF INVENTION

Technical Problem

A reinforcement device of PTL 1 has a first heating pattern provided at a central portion and a second heating pattern provided in the vicinity of each of both ends in a longitudinal direction and the heating patterns are made such that the temperature can be independently controlled. Further, in this reinforcement device, the first heating pattern is heated prior to the second heating pattern, whereby a tube made of heat-shrinkable resin is shrunk in sequence toward both end sides from the central portion in the longitudinal direction, thereby being brought into close contact with a fusion-spliced section of an optical fiber without an air gap.

However, in the control in which the first heating pattern is heated and the second heating pattern is energized and heated after energization of the first heating pattern is ended, there is a problem in that a long period of time is required for a reinforcing operation.

The present invention has an object to provide a reinforcement device for an optical-fiber spliced section in which it is possible to shorten a reinforcing operation time for reinforcing an optical-fiber spliced section.

Solution to Problem

A reinforcement device for an optical-fiber spliced section, according to the invention, which heats and shrinks a protective member having a heat-shrinkable property and covering an optical-fiber spliced section where optical fibers are spliced to each other with end faces brought into contact with each other, the reinforcement device comprises:
a first heater on which the optical-fiber spliced section covered with the protective member is disposed and which heats a central portion of the protective member at a first temperature;
second heaters which are respectively provided on both sides of the first heater along a longitudinal direction of the optical fiber and respectively heat both end portions of the protective member at a second temperature; and
a control unit which performs energization control for heating each of the first heater and the second heaters,
wherein the control unit makes an energizing time of the first heater and an energizing time of each of the second heaters at least partially overlap.

Advantageous Effects of Invention

According to the invention, it is possible to provide a reinforcement device for an optical-fiber spliced section in which it is possible to shorten a reinforcing operation time for reinforcing an optical-fiber spliced section.

DESCRIPTION OF EMBODIMENTS

Summary of Embodiment of the Present Invention

First, a summary of an embodiment of the present invention will be described.

(1) A reinforcement device for an optical-fiber spliced section, according to an exemplary embodiment of the invention, which heats and shrinks a protective member having a heat-shrinkable property and covering an optical-fiber spliced section where optical fibers are spliced to each other with end faces brought into contact with each other, the reinforcement device comprises:

a first heater on which the optical-fiber spliced section covered with the protective member is disposed and which heats a central portion of the protective member at a first temperature;

second heaters which are respectively provided on both sides of the first heater along a longitudinal direction of the optical fiber and respectively heat both end portions of the protective member at a second temperature; and a control unit which performs energization control for heating each of the first heater and the second heaters, wherein the control unit makes an energizing time of the first heater and an energizing time of each of the second heaters at least partially overlap.

According to the configuration of (1), by making the energizing time of the first heater and the energizing time of the second heater overlap, it is possible to shorten a reinforcing operation time, as compared to a case where the energization of the second heater is started after the end of the energization of the first heater. In this way, it is possible to end a reinforcing operation in a short period time while favorably reinforcing the optical-fiber spliced section by smoothly shrinking the protective member by a plurality of heaters.

Further, by energizing and heating the second heaters on both sides of the first heater when energizing and heating the first heater, it is possible to suppress the heat dissipation amount of the first heater.

Further, the reinforcing operation time becomes shorter and the heat dissipation amount of the first heater is suppressed, whereby it is possible to reduce the power consumption.

(2) The control unit may make a heating-up period to the first temperature of the first heater and a heating-up period to the second temperature of each of the second heaters at least partially overlap with each other.

According to the configuration of (2), by making the heating-up period of the first heater and the heating-up period of the second heater overlap, it is possible to shorten the reinforcing operation time. Further, the second heaters on both sides of the first heater rise in temperature at the time of the temperature rising of the first heater, whereby it is possible to suppress the heat dissipation amount from the first heater at the time of the temperature rising. In this way, it is possible to efficiently and quickly raise the temperature of the first heater to the first temperature.

(3) The control unit may make an arrival time at the first temperature of the first heater earlier than an arrival time at the second temperature of each of the second heaters.

According to the configuration of (3), it is possible to reliably extrude air in the interior of the protective member from both ends by reliably shrinking the protective member from the central portion thereof. In this way, the protective member is brought into close contact with the optical-fiber spliced section, thereby favorably reinforcing the optical-fiber spliced section, and thus it is possible to increase the reliability of a reinforced portion.

(4) The control unit may make the first temperature higher than the second temperature.

According to the configuration of (4), it is possible to cause the shrinkage of the protective member to reliably progress toward both ends from the center, and thus it is possible to increase the reliability of the reinforcement site by eliminating the remaining air bubbles in the interior of the protective member.

(5) The control unit may make the percentage of overlap of the energizing time of the first heater and the energizing time of each of the second heaters be greater than or equal to 30% of a heat shrink process time.

According to the configuration of (5), by making the percentage of overlap of the energizing times to be greater than or equal to 30% of the heat shrink process time, as compared to a case where the energization of the second heater is started after the end of the energization of the first heater, it is possible to reduce the reinforcing operation time by 15% or more and it is possible to reduce the power consumption by 5% or more.

Details of Embodiment of the Present Invention

Hereinafter, an example of an embodiment of a reinforcement device for an optical-fiber spliced section according to the present invention will be described with reference to the drawings. In addition, the present invention is not limited to the exemplification and it is intended to include all modifications within the meaning and the scope equivalent to those in the appended claims, as indicated by the claims.

Figure 1:
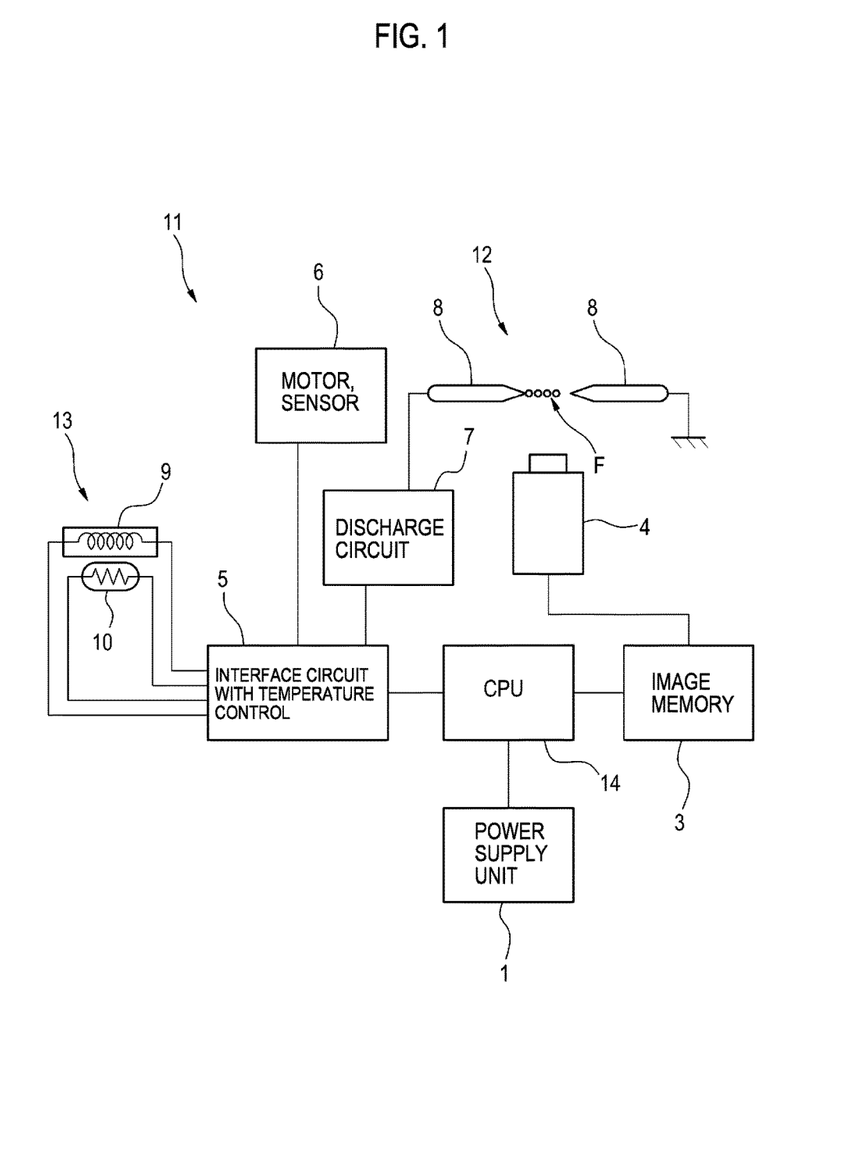
FIG. 1 is a schematic block diagram showing the configuration of an optical-fiber fusion-splicing device provided with a reinforcement device for an optical-fiber spliced section according to an embodiment of the present invention.

FIG. 1 is a schematic block diagram showing the configuration of an optical-fiber fusion-splicing device 11 provided with a reinforcement device 13 for an optical-fiber spliced section according to an embodiment of the present invention.

As shown in FIG. 1, the reinforcement device 13 for an optical-fiber spliced section according to this example is provided in the fusion-splicing device 11. The fusion-splicing device 11 provided with the reinforcement device 13 is provided with a fusion device 12 and a CPU (an example of a control unit) 14. Further, the fusion-splicing device 11 is provided with a power supply unit 1, an image memory 3, a camera 4, an interface circuit with temperature control 5, a motor and sensor 6, and a discharge circuit 7.

The fusion device 12 has a discharge electrode 8, and in the fusion device 12, a fusion-splicing operation of heating and fusing abutting parts of optical fibers F with end faces brought into contact with each other, by arc discharge, is performed.

The reinforcement device 13 has a heater 9 and a thermistor 10, and in the reinforcement device 13, a reinforcing operation of heating and shrinking a heat-shrinkable resin which covers a fusion-spliced section (an example of a spliced section) FS (described later) of the optical fiber F is performed.

The fusion-splicing operation of the fusion device 12 and the reinforcing operation of the reinforcement device 13 are controlled by the CPU 14 and the interface circuit with temperature control 5.

The power supply unit 1 supplies electric power to the heater 9 through the interface circuit with temperature control 5 and supplies electric power to a pair of discharge electrodes 8 of the fusion device 12 through the interface circuit with temperature control 5 and the discharge circuit 7 under the control of the CPU 14. The pair of discharge electrodes 8 is disposed with a distance therebetween, and the optical fibers F to be fusion-spliced are disposed in the vicinity of a line connecting the centers of the discharge electrodes 8. In the fusion device 12, the optical fibers F butted with each other are fusion-spliced to each other by being heated by arc discharge which is generated between the discharge electrodes 8.

The camera 4 is disposed below the optical fibers F. The image memory 3 is connected to the camera 4, and image data of the magnified optical fibers F is stored in the image memory 3. As the camera 4, a CCD camera can be used, and as the image memory 3, a frame memory can be used.

The heater 9 of the reinforcement device 13 heats protective members 31 and 32 (described later) each composed of a tubular heat-shrinkable resin disposed so as to cover the outer periphery in order to protect the fusion-spliced section FS of the fusion-spliced optical fiber F, thereby fixing the fusion-spliced section FS by the protective members 31 and 32. The thermistor 10 measures a heating temperature of the heater 9 and adjusts the amount of electric power that the interface circuit with temperature control 5 supplies to the heater 9, based on the measured value. Further, the interface circuit with temperature control 5 is connected to the motor and sensor 6 and the discharge circuit 7, thereby enabling the control by the CPU 14.

Figure 2:
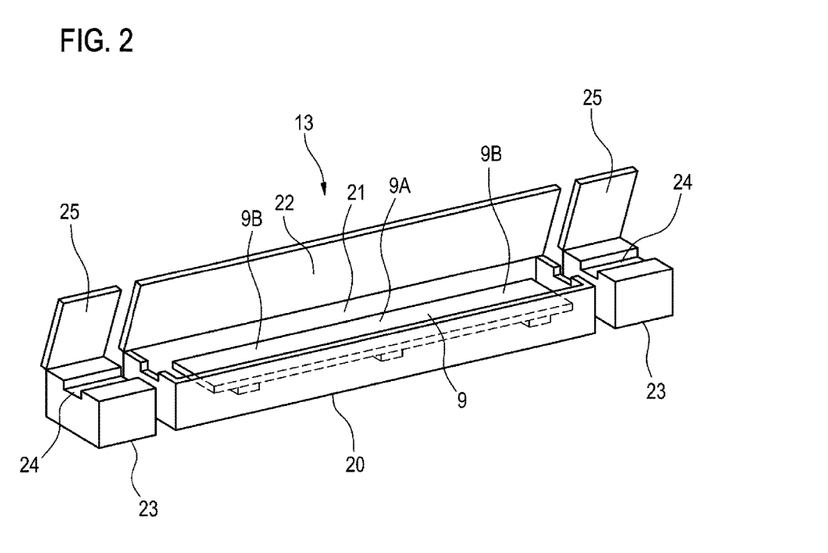
FIG. 2 is a perspective view of the reinforcement device according to the embodiment of the present invention.

FIG. 2 is a perspective view of the reinforcement device 13 according to the embodiment of the present invention.

As shown in FIG. 2, the reinforcement device 13 has a case 20. The inside of the case 20 is regarded as a heating chamber 21 provided with the heater 9. A lid 22 is provided at the case 20 so as to be able to be opened and closed. Further, clamp sections 23 are provided at both ends of the case 20. An optical fiber placing groove 24 is formed in an upper portion of each of the clamp sections 23. Further, an openable and closable presser plate 25 is provided at the upper portion of each of the clamp sections 23.

In the reinforcement device 13, the fusion-spliced section FS of the optical fiber F covered with the protective members 31 and 32 is placed on the heater 9 in the heating chamber 21 of the case 20 and the lid 22 is then closed. Then, the optical fibers F leading to both sides are placed in the optical fiber placing grooves 24 of the clamp sections 23 disposed on both sides and the presser plates 25 are then closed. In this way, the fusion-spliced section FS of the optical fiber F is set to the reinforcement device 13.

Figure 3:
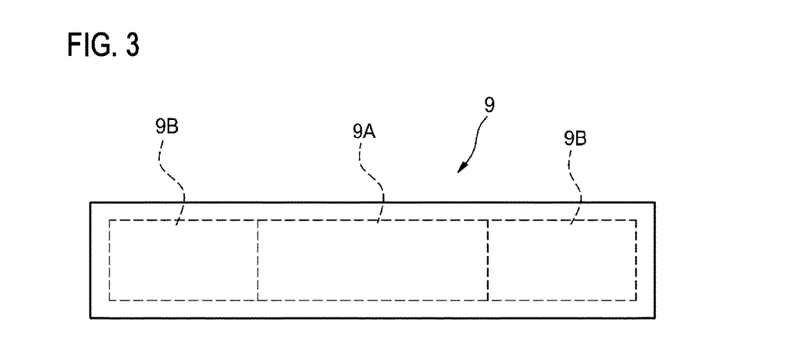
FIG. 3 is a schematic plan view of a heater provided in the reinforcement device.

FIG. 3 is a schematic plan view of the heater 9 provided in the reinforcement device 13.

As shown in FIG. 3, the heater 9 of the reinforcement device 13 has a first heater 9A and a second heater 9B. The fusion-spliced section FS of the optical fiber F covered with the protective members 31 and 32 is disposed on the first heater 9A, and the first heater 9A heats central portions of the protective members 31 and 32. The first heater 9A is energized, thereby rising in temperature to a first temperature, and heats the central portions of the protective members 31 and 32 at the first temperature.

The second heaters 9B are provided on both sides of the first heater 9A along a longitudinal direction of the optical fiber F. The second heaters 9B heat both end portions of the protective members 31 and 32. The second heaters 9B are energized, thereby rising in temperature to a second temperature, and heat both end portions of the protective members 31 and 32 at the second temperature. The energization of the first heater 9A and the energization of the second heater 9B are independently controlled by the CPU 14.

Next, an operation of reinforcing the fusion-spliced section FS of the optical fiber F in the reinforcement device 13 according to this example will be described.

Figure 4A:
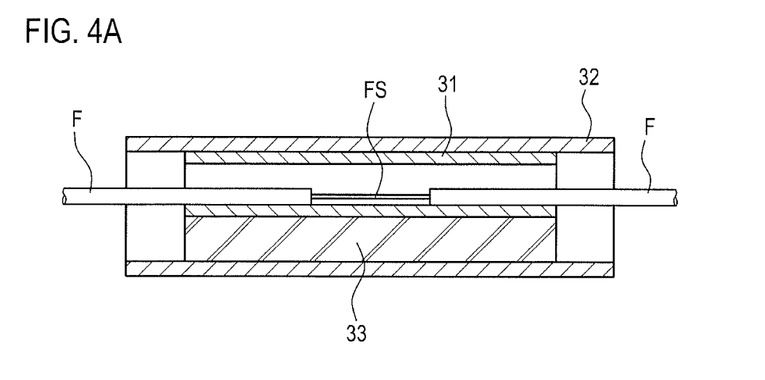
FIGS. 4A to 4C are vertical cross-sectional views of the optical-fiber fusion-spliced section describing a heat shrink state of a protective member which protects an optical-fiber fusion-spliced section.
Figure 4B:
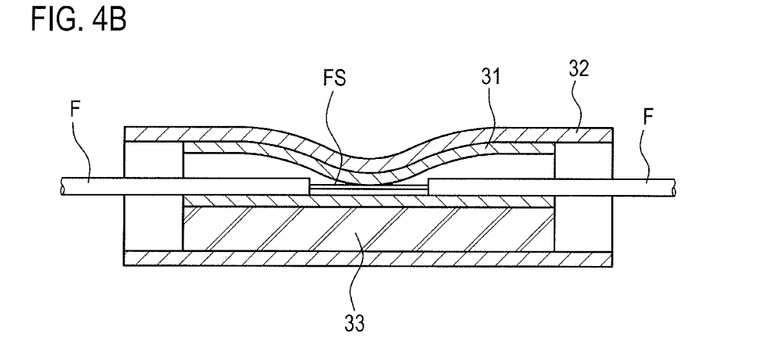
Figure 4C:
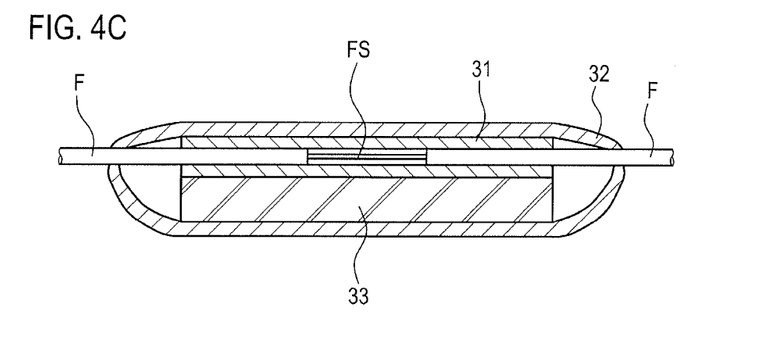

FIGS. 4A to 4C are diagrams describing the heat shrink states of the protective members 31 and 32 which protect the fusion-spliced section FS of the optical fiber F, and are vertical cross-sectional views of the fusion-spliced section FS of the optical fiber F.

As shown in FIG. 4A, the optical fiber F fusion-spliced by the fusion device 12 is removed from the fusion device 12 and the protective members 31 and 32 having different diameters and each composed of a tubular heat-shrinkable resin, which is mounted on the optical fiber F on one side in advance, are moved. Then, the protective member 31 having a small diameter is disposed so as to cover the fusion-spliced section FS of the optical fiber F. Further, the protective member 32 having a large diameter is disposed so as to cover the fusion-spliced section FS of the optical fiber F covered with the protective member 31 having a small diameter, and a reinforcement material 33 along the fusion-spliced section FS.

The fusion-spliced section FS of the optical fiber F is placed on the heater 9 in the heating chamber 21 of the case 20 of the reinforcement device 13 and the lid 22 is then closed. Then, the optical fibers F leading to both sides are placed in the optical fiber placing grooves 24 of the clamp sections 23 disposed on both sides and the presser plates 25 are then closed. In this way, the fusion-spliced section FS of the optical fiber F is set to the reinforcement device 13.

Next, a reinforcement start switch (not shown) is pressed down. Then, the first heater 9A and the second heaters 9B configuring the heater 9 of the reinforcement device 13 are energized, whereby the temperature of the first heater 9A is raised to a predetermined first temperature and the temperature of each of the second heaters 9B is raised to a predetermined second temperature.

In this way, the central portions in the longitudinal direction of the protective members 31 and 32 are heated by the first heater 9A, and both end portions in the longitudinal direction are heated by the second heaters 9B. Further, the central portion in the longitudinal direction of the protective member 31 heat-shrinks, as shown in FIG. 4B, and both end portions in the longitudinal direction heat-shrink, as shown in FIG. 4C. In this way, the fusion-spliced section FS of the optical fiber F along which the reinforcement material 33 is disposed is covered with and reinforced by the protective members 31 and 32.

Next, specific energization control with respect to the first heater 9A and the second heater 9B by the CPU 14 of the reinforcement device 13 will be described.

Figure 5:
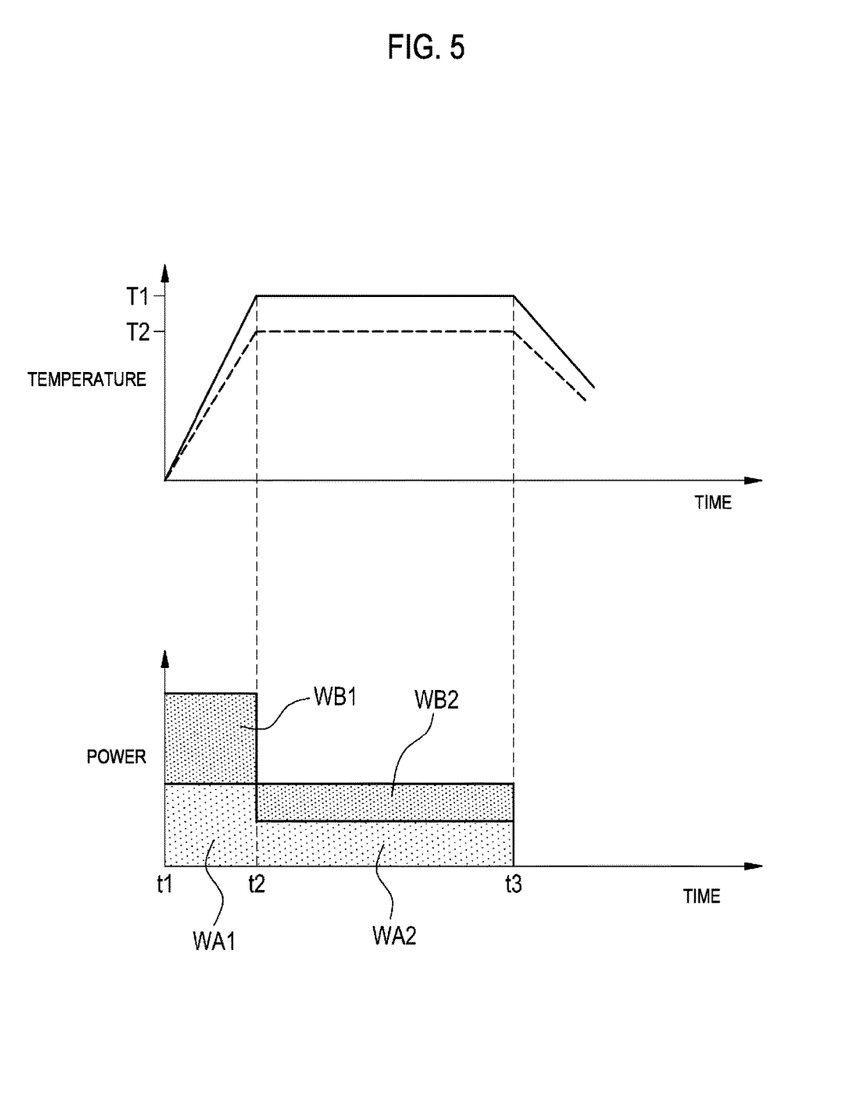
FIG. 5 is a graph showing control patterns A of a heating temperature characteristic and supplied power in the heater of the reinforcement device according to the embodiment of the present invention.

FIG. 5 is a graph showing control patterns A of a heating temperature characteristic and supplied power in the heater 9 of the reinforcement device 13 according to the embodiment of the present invention. In addition, in FIG. 5, the temperature characteristic of the first heater 9A is shown by a solid line and the temperature characteristic of the second heater 9B is shown by a dashed line.

As shown in FIG. 5, if the reinforcement start switch is pressed down, energization of the first heater 9A and energization of the second heater 9B are stated at the same time (t1 in FIG. 5). In this way, the first heater 9A rises in temperature to a first temperature T1 and the second heater 9B rises in temperature to a second temperature T2. At this time, supplied power in the reinforcement device 13 has the total value (about 96 W) of the supplied power (WA1 in FIG.

5) to the first heater 9A and the supplied power (WB1 in FIG. 5) to the second heater 9B.

If the first heater 9A reaches the first temperature T1 and the second heater 9B reaches the second temperature T2 (t2 in FIG. 5), the first heater 9A enters a temperature control state of being maintained at the first temperature T1 and the second heater 9B enters a temperature control state of being maintained at the second temperature T2. Further, a heating-up period (t2-t1) until the first heater 9A and the second heater 9B enter the temperature control states is, for example, about 4 seconds. Here, the CPU 14 performs energization control with respect to the first heater 9A and the second heater 9B such that the first temperature T1 becomes higher than the second temperature T2. For example, the first temperature T1 of the first heater 9A is set to be 230° C. and the second temperature T2 of the second heater 9B is set to be 200° C.

Also in the temperature control states, the supplied power in the reinforcement device 13 has the total value (about 48 W) of the supplied power (WA2 in FIG. 5) to the first heater 9A and the supplied power (WB2 in FIG. 5) to the second heater 9B. Further, in the temperature control states, the supplied power to the first heater 9A and the second heater 9B becomes lower than that at the time of the temperature rising. For this reason, the supplied power in the reinforcement device 13 has a value lower than that at the time of the temperature rising.

After the elapse of a temperature control time when the protective members 31 and 32 are sufficiently shrunk (t3 in FIG. 5), the energization of the first heater 9A and the energization of the second heater 9B are ended at the same time, and a process of heat-shrinking the protective members 31 and 32 in a reinforcing operation is ended. In this way, the fusion-spliced section FS of the optical fiber F along which the reinforcement material 33 is disposed is covered with and reinforced by the protective members 31 and 32. Further, the temperature control time (t3-t2) of each of the first heater 9A and the second heater 9B is, for example, about 10 seconds. Further, after the end of the energization of the first heater 9A and the second heater 9B, the first heater 9A, the second heater 9B, and the protective members 31 and 32 are cooled by natural cooling.

Here, energization control according to a reference example will be described.

Figure 6:
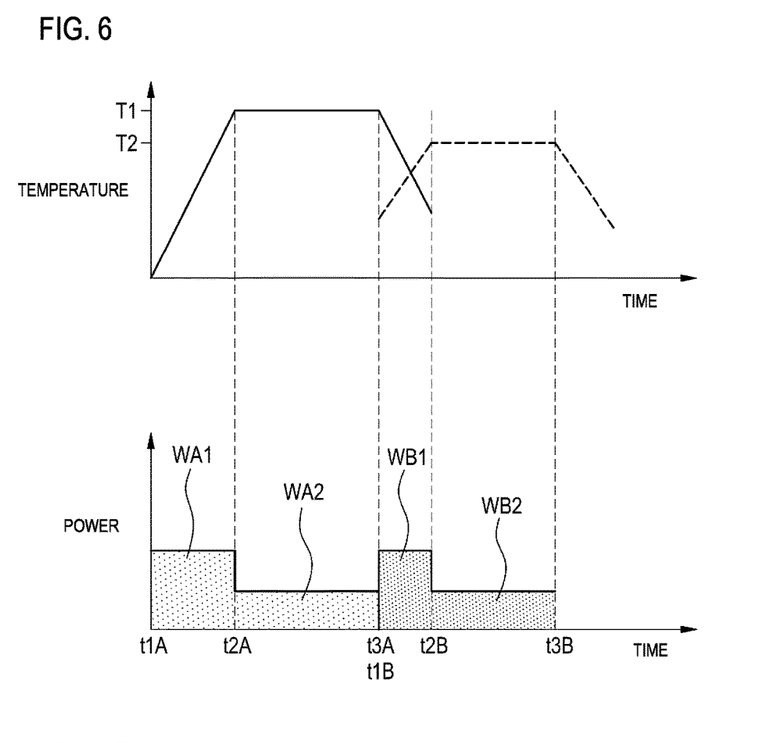
FIG. 6 is a graph showing control patterns of a heating temperature characteristic and supplied power in a heater describing the energization control according to a reference example.

FIG. 6 is a graph showing a heating temperature characteristic and supplied power in the heater 9 describing the energization control according to the reference example.

As shown in FIG. 6, in the reference example, if the reinforcement start switch is pressed down, first, energization of the first heater 9A is started (t1A in FIG. 6). In this way, the first heater 9A rises in temperature to the first temperature T1. At this time, the supplied power in the reinforcement device 13 is the supplied power WA1 (about 48 W) to the first heater 9A.

If the first heater 9A reaches the first temperature T1 (t2A in FIG. 6), the first heater 9A enters a temperature control state of being maintained at the first temperature T1. Further, a heating-up period (t2A-t1A) until the first heater 9A enters the temperature control state is, for example, about 4 seconds. In the temperature control state, the supplied power in the reinforcement device 13 is the supplied power WA2 (about 24 W) to the first heater 9A.

After the elapse of the temperature control time (t3A in FIG. 6), the energization of the first heater 9A is ended and at the same time, the energization of the second heater 9B is started (t1B in FIG. 6). In this way, the second heater 9B rises in temperature to the second temperature T2 from a state of being slightly warmed by the heat of the first heater 9A. At this time, the supplied power in the reinforcement device 13 is the supplied power WB1 (about 48 W) to the second heater 9B. Further, the temperature control time (t3A-t2A) of the first heater 9A is, for example, about 10 seconds.

If the second heater 9B reaches the second temperature T2 (t2B in FIG. 6), the second heater 9B enters a temperature control state of being maintained at the second temperature T2. Further, a heating-up period (t2B-t1B) until the second heater 9B enters the temperature control state is, for example, about 4 seconds. In the temperature control state, the supplied power in the reinforcement device 13 is the supplied power WB2 (about 24 W) to the second heater 9B.

After the elapse of the temperature control time (t3B in FIG. 6), the energization of the second heater 9B is ended, and thus the reinforcing operation is ended. Further, the temperature control time (t3B-t2B) of the second heater 9B is, for example, about 10 seconds.

In this manner, the energization of the second heater 9B is started after the end of the energization of the first heater 9A, and therefore, a heat shrink process time (t3B-t1A) for heat-shrinking the protective members 31 and 32 becomes longer (for example, about 28 seconds), and thus a long period of time is required for the operation of reinforcing the fusion-spliced section FS of the optical fiber F.

In contrast, in the reinforcement device 13 according to this embodiment, by making the energizing time of the first heater 9A and the energizing time of the second heater 9B overlap, it is possible to make the heat shrink process time (t3-t1) for heat-shrinking the protective members 31 and 32 short (for example, about 14 seconds), and thus it is possible to shorten the reinforcing operation time for the fusion-spliced section FS of the optical fiber F. In this way, it is possible to end the reinforcing operation in a short period of time while favorably reinforcing the fusion-spliced section FS of the optical fiber F by smoothly shrinking the protective members 31 and 32 by the first heater 9A and the second heaters 9B. Further, by energizing and heating the second heaters 9B on both sides of the first heater 9A when energizing and heating the first heater 9A, it is possible to suppress the heat dissipation amount of the first heater 9A.

In this manner, according to this embodiment, the reinforcing operation time becomes shorter and the heat dissipation amount of the first heater 9A is suppressed, whereby it is possible to reduce the power consumption.

In particular, by making the heating-up period of the first heater 9A and the heating-up period of the second heater 9B overlap, it is possible to shorten the reinforcing operation time, and moreover, the second heaters 9B on both sides of the first heater 9A rise in temperature at the time of the temperature rising of the first heater 9A, whereby it is possible to suppress the heat dissipation amount from the first heater 9A at the time of the temperature rising. In this way, it is possible to efficiently and quickly raise the temperature of the first heater 9A to the first temperature T1.

Further, by making the first temperature T1 higher than the second temperature T2, it is possible to cause the shrinkage of the protective members 31 and 32 to reliably progress toward both ends from the center, and thus it is possible to increase the reliability of a reinforcement site by eliminating the remaining air bubbles in the interiors of the protective members 31 and 32.

Further, in the above-described embodiment, the energizing time of the first heater 9A and the energizing time of the second heater 9B are made to entirely overlap. However, if the energizing times are made to at least partially overlap, it is possible to reduce the reinforcing operation time.

It is preferable that the percentage of overlap of the energizing time of the first heater 9A and the energizing time of the second heater 9B is set to be greater than or equal to 30% of the heat shrink process time. By making the percentage of overlap of the energizing times be greater than or equal to 30% of the heat shrink process time, as compared to a case where the energization of the second heater 9B is started after the end of the energization of the first heater 9A, it is possible to reduce the reinforcing operation time by 15% or more and it is possible to reduce the power consumption by 5% or more.

Furthermore, it is preferable to make the percentage of overlap of the energizing times be greater than or equal to 50% of the heat shrink process time. It is possible to reduce the reinforcing operation time by 30% or more and it is possible to reduce the power consumption by 10% or more.

Next, energization control of various patterns making the energizing time of the first heater 9A and the energizing time of the second heater 9B at least partially overlap will be described.

FIGS. 7 to 17 are graphs showing control patterns of a heating temperature characteristic describing the energization control of the first heater 9A and the second heater 9B.

Figure 7:
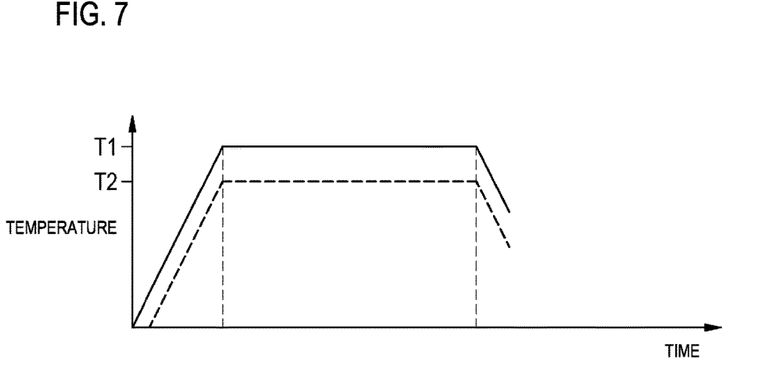
FIG. 7 is a graph showing a control pattern B of a heating temperature characteristic describing the energization control of a first heater and a second heater.

A control pattern B shown in FIG. 7 is a control pattern in which the energization of the second heater 9B is started after the start of the energization of the first heater 9A and the subsequent energizing times are made to overlap.

Figure 8:
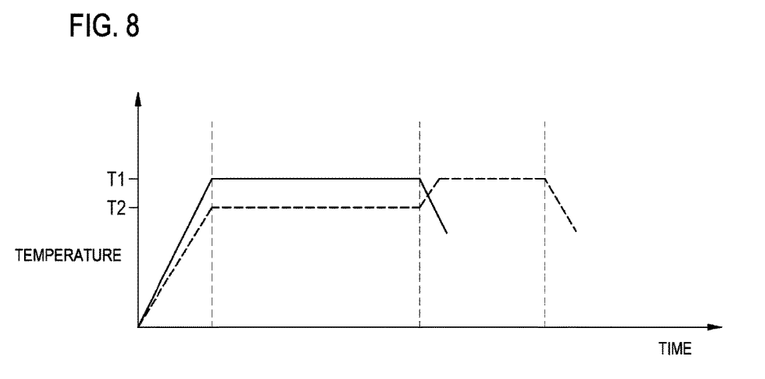
FIG. 8 is a graph showing a control pattern C of a heating temperature characteristic describing the energization control of the first heater and the second heater.

In a control pattern C shown in FIG. 8, after the energization of the first heater 9A and the energization of the second heater 9B are started at the same time, the energizing times are made to overlap. Thereafter, after the end of the energization of the first heater 9A, the second heater 9B is made to be continuously in a temperature control state by a necessary time according to the diameters or the lengths of the protective members 31 and 32. Further, after the end of the energization of the first heater 9A, a margin occurs in power supply capacity, and therefore, when continuing the temperature control of the second heater 9B, the heating amount is increased by further raising a temperature from the second temperature T2. In this way, the heat shrinkage of the protective members 31 and 32 is promoted, whereby it is possible to shorten the reinforcing operation time.

Figure 9:
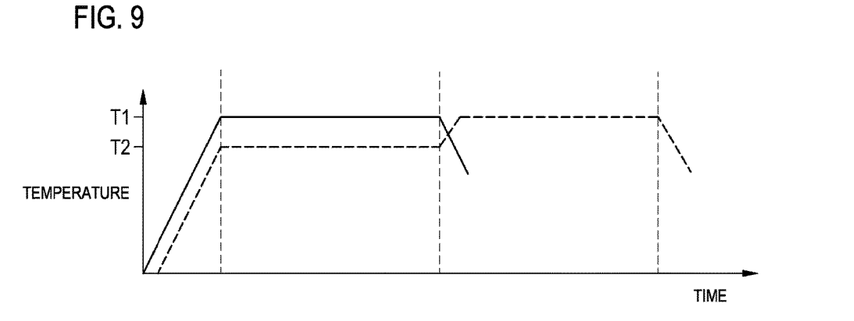
FIG. 9 is a graph showing a control pattern D of a heating temperature characteristic describing the energization control of the first heater and the second heater.

In a control pattern D shown in FIG. 9, the energization of the second heater 9B is started after the start of the energization of the first heater 9A and the subsequent energizing times are made to overlap. Then, after the end of the energization of the first heater 9A, the second heater 9B is further raised in temperature and is made to be continuously in a temperature control state by a necessary time according to the diameters or the lengths of the protective members 31 and 32.

Figure 10:
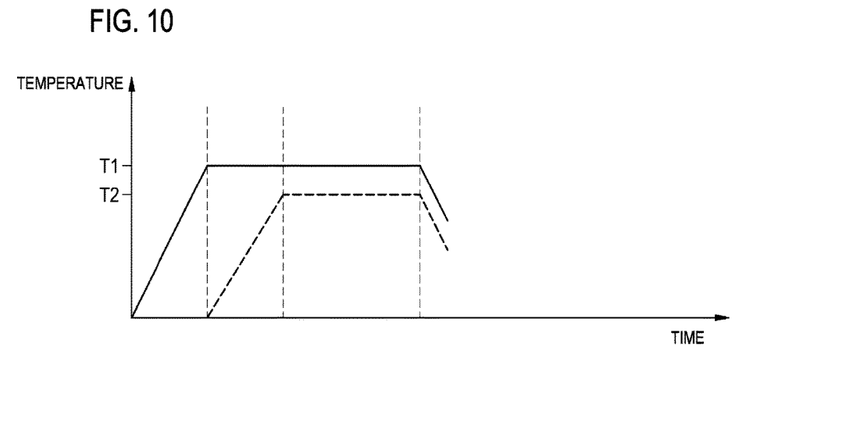
FIG. 10 is a graph showing a control pattern E of a heating temperature characteristic describing the energization control of the first heater and the second heater.

In a control pattern E shown in FIG. 10, after the start of the energization of the first heater 9A, the energization of the second heater 9B is started at a point in time when the temperature of the first heater 9A rises and reaches the first temperature T1. Then, the subsequent energizing times are made to overlap.

Figure 11:
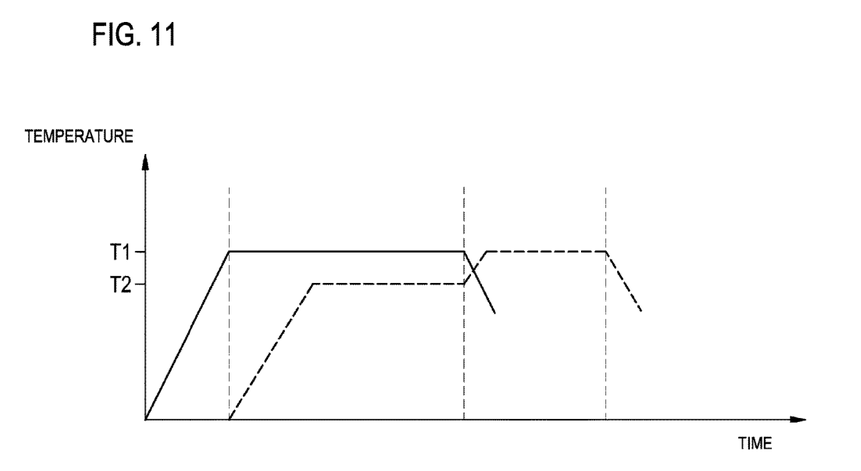
FIG. 11 is a graph showing a control pattern F of a heating temperature characteristic describing the energization control of the first heater and the second heater.

In a control pattern F shown in FIG. 11, after the start of the energization of the first heater 9A, the energization of the second heater 9B is started at a point in time when the temperature of the first heater 9A rises and reaches the first temperature T1. Then, the subsequent energizing times are made to overlap, and after the end of the energization of the first heater 9A, the second heater 9B is further raised in temperature and is made to be continuously in a temperature control state by a necessary time according to the diameters or the lengths of the protective members 31 and 32.

Figure 12:
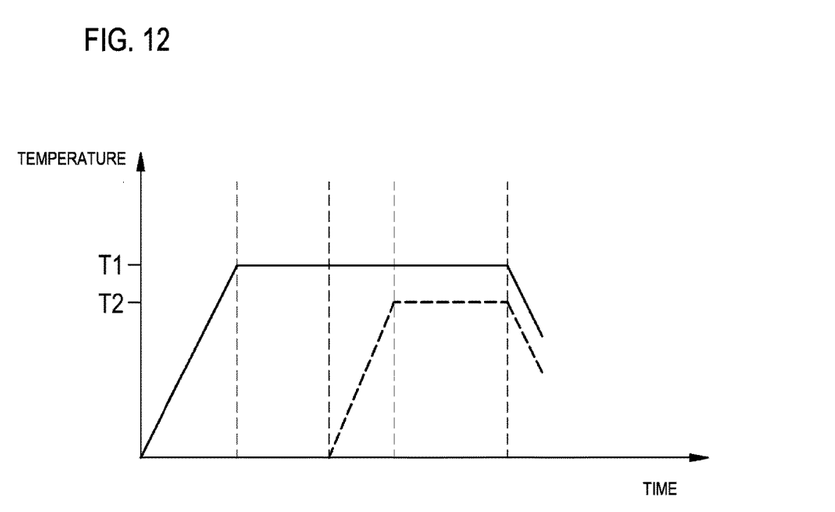
FIG. 12 is a graph showing a control pattern G of a heating temperature characteristic describing the energization control of the first heater and the second heater.

In a control pattern G shown in FIG. 12, after the start of the energization of the first heater 9A, the energization of the second heater 9B is started after the first heater 9A rises in temperature, thereby reaching the first temperature T1, and enters the temperature control state. Then, the subsequent energizing times are made to overlap.

Figure 13:
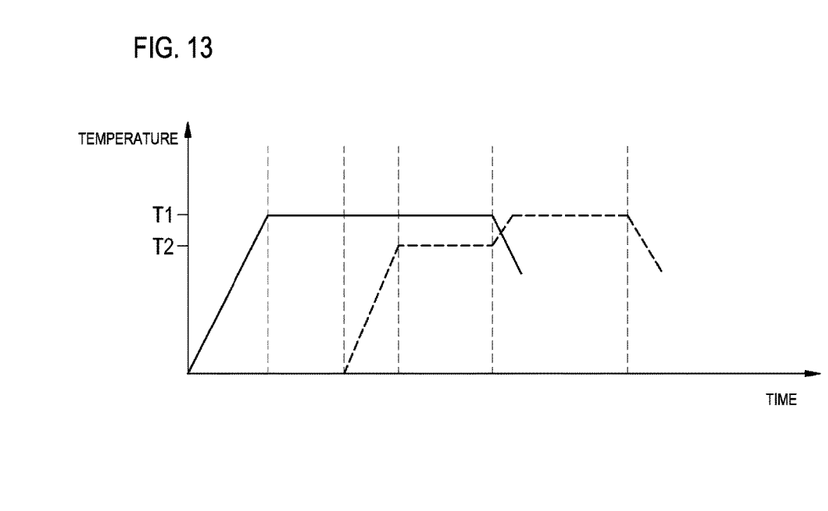
FIG. 13 is a graph showing a control pattern H of a heating temperature characteristic describing the energization control of the first heater and the second heater.

In a control pattern H shown in FIG. 13, after the start of the energization of the first heater 9A, the energization of the second heater 9B is started after the first heater 9A rises in temperature, thereby reaching the first temperature T1, and enters the temperature control state. Then, the subsequent energizing times are made to overlap, and after the end of the energization of the first heater 9A, the second heater 9B is further raised in temperature and is made to be continuously in a temperature control state by a necessary time according to the diameters or the lengths of the protective members 31 and 32.

Figure 14:
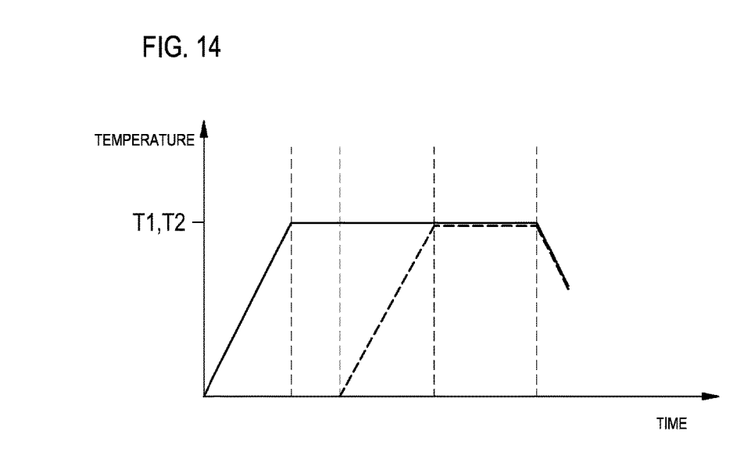
FIG. 14 is a graph showing a control pattern I of a heating temperature characteristic describing the energization control of the first heater and the second heater.

In a control pattern I shown in FIG. 14, after the start of the energization of the first heater 9A, the energization of the second heater 9B is started after the first heater 9A rises in temperature, thereby reaching the first temperature T1, and enters the temperature control state. Then, the subsequent energizing times are made to overlap. In the control pattern I, the second temperature T2 of the second heater 9B is set to be the same temperature as the first temperature T1 of the first heater 9A.

Figure 15:
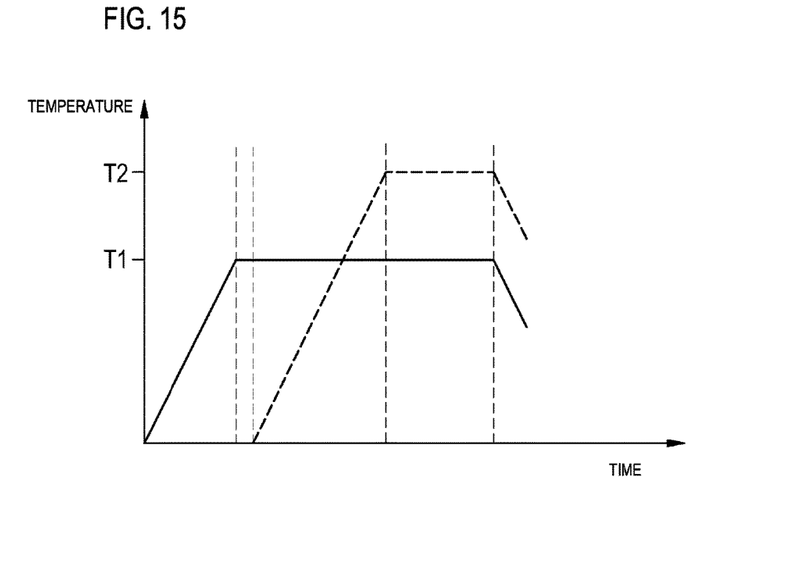
FIG. 15 is a graph showing a control pattern J of a heating temperature characteristic describing the energization control of the first heater and the second heater.

In a control pattern J shown in FIG. 15, after the start of the energization of the first heater 9A, the energization of the second heater 9B is started after the first heater 9A rises in temperature, thereby reaching the first temperature T1, and enters the temperature control state. Then, the subsequent energizing times are made to overlap. In the control pattern J, the second temperature T2 of the second heater 9B is set to be a temperature higher than the first temperature T1 of the first heater 9A.

Figure 16:
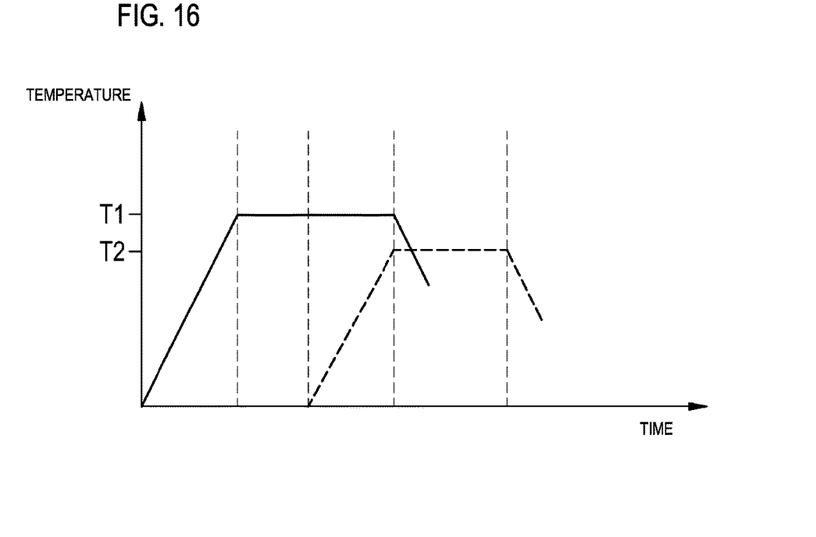
FIG. 16 is a graph showing a control pattern K of a heating temperature characteristic describing the energization control of the first heater and the second heater.

In a control pattern K shown in FIG. 16, after the start of the energization of the first heater 9A, the energization of the second heater 9B is started after the first heater 9A rises in temperature, thereby reaching the first temperature T1, and enters the temperature control state. Then, the subsequent energizing times are made to overlap. In the control pattern K, the energization of the first heater 9A is ended at a point in time when the temperature of the second heater 9B rises and reaches the second temperature T2.

Figure 17:
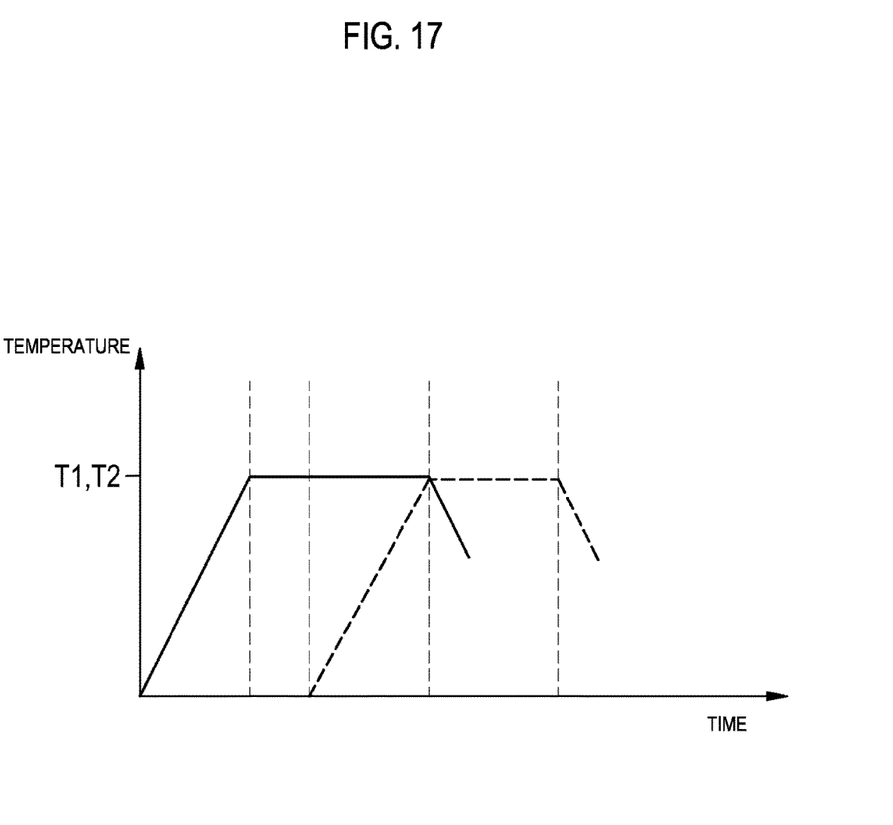
FIG. 17 is a graph showing a control pattern L of a heating temperature characteristic describing the energization control of the first heater and the second heater.

In a control pattern L shown in FIG. 17, after the start of the energization of the first heater 9A, the energization of the second heater 9B is started after the first heater 9A rises in temperature, thereby reaching the first temperature T1, and enters the temperature control state. Then, the subsequent energizing times are made to overlap. In the control pattern L, the energization of the first heater 9A is ended at a point in time when the second heater 9B rises in temperature, thereby reaching the second temperature T2. Further, in the control pattern L, the second temperature T2 of the second heater 9B is set to be the same temperature as the first temperature T1 of the first heater 9A.

Also in the control patterns B to L shown in FIGS. 7 to 17 described above, by making the energizing time of the first heater 9A and the energizing time of the second heater 9B at least partially overlap, it is possible to reduce the reinforcing operating time.

In particular, in the control patterns E to L shown in FIGS. 10 to 17, an arrival time at the first temperature T1 of the first heater 9A is set to be earlier than an arrival time at the second temperature T2 of the second heater 9B. According to such control patterns, it is possible to reliably extrude air in the interiors of the protective members 31 and 32 from both ends by reliably shrinking the protective members 31 and 32 from the central portions thereof. In this way, the protective members 31 and 32 are brought into close contact with the fusion-spliced section FS of the optical fiber F, thereby favorably reinforcing the fusion-spliced section FS of the optical fiber F, and thus it is possible to increase the reliability of a reinforced portion.

Further, in the control patterns shown in FIGS. 10 to 17, the energization control is performed such that the temperature rising in the first heater 9A and the temperature rising in the second heater 9B do not overlap. Therefore, it is possible to suppress the maximum value of the supplied power in the reinforcement device 13. In this way, it is possible to perform a reinforcing operation even at the time of an operation of other mechanisms or the like consuming power, which is provided in the fusion-splicing device 11.

In addition, specific energizing time of or power supplied to the first heater 9A and the second heater 9B, specific heating temperatures of the first heater 9A and the second heater 9B, or the like in the above-described embodiment is an example, and the energizing time, the supplied power, and the heating temperature are set according to various conditions.

The present invention has been described in detail with reference to a specific embodiment. However, it will be apparent to those skilled in the art that various changes or modifications can be made without departing from the spirit and the scope of the present invention.

This application is based on Japanese Patent Application No. 2014-013687 filed on Jan. 28, 2014, the content of which is incorporated herein by reference.

REFERENCE SIGNS LIST

9A: first heater
9B: second heater
13: reinforcement device
14: CPU (an example of a control unit)
31, 32: protective member
F: optical fiber
FS: fusion-spliced section (an example of a spliced section)

The invention claimed is:

1. A reinforcement device for an optical-fiber spliced section, which heats and shrinks a protective member having a heat-shrinkable property and covering an optical-fiber spliced section where optical fibers are spliced to each other with end faces brought into contact with each other, the reinforcement device comprising:
a first heater on which the optical-fiber spliced section covered with the protective member is disposed and which heats a central portion of the protective member at a first temperature which is a highest temperature attained by the first heater;
second heaters which are respectively provided on both sides of the first heater along a longitudinal direction of the optical fiber and respectively heat both end portions of the protective member at a second temperature which is a highest temperature attained by the second heaters; and
a control unit which performs energization control for heating each of the first heater and the second heaters,
wherein the control unit makes an energizing time of the first heater and an energizing time of each of the second heaters at least partially overlap; and
wherein the control unit makes the first temperature higher than the second temperature.

2. The reinforcement device for an optical-fiber spliced section according to claim 1, wherein the control unit makes a heating-up period to the first temperature of the first heater and a heating-up period to the second temperature of each of the second heaters at least partially overlap with each other.

3. The reinforcement device for an optical-fiber spliced section according to claim 1, wherein the control unit makes an arrival time at the first temperature of the first heater earlier than an arrival time at the second temperature of each of the second heaters.

4. The reinforcement device for an optical-fiber spliced section according to claim 1, wherein the control unit makes the percentage of overlap of the energizing time of the first heater and the energizing time of each of the second heaters be greater than or equal to 30% of a heat shrink process time.

5. The reinforcement device for an optical-fiber spliced section according to claim 2, wherein the control unit makes an arrival time at the first temperature of the first heater earlier than an arrival time at the second temperature of each of the second heaters.

6. The reinforcement device for an optical-fiber spliced section according to claim 2, wherein the control unit makes the percentage of overlap of the energizing time of the first heater and the energizing time of each of the second heaters be greater than or equal to 30% of a heat shrink process time.

7. The reinforcement device for an optical-fiber spliced section according to claim 3, wherein the control unit makes the percentage of overlap of the energizing time of the first heater and the energizing time of each of the second heaters be greater than or equal to 30% of a heat shrink process time.

8. The reinforcement device for an optical-fiber spliced section according to claim 5, wherein the control unit makes the percentage of overlap of the energizing time of the first heater and the energizing time of each of the second heaters be greater than or equal to 30% of a heat shrink process time.

9. The reinforcement device for an optical-fiber spliced section according to claim 1, wherein the control unit makes the energization of each of the second heaters to be started after the start of the energization of the first heater.

10. A reinforcement device for an optical-fiber spliced section, which heats and shrinks a protective member having a heat-shrinkable property and covering an optical-fiber spliced section where optical fibers are spliced to each other with end faces brought into contact with each other, the reinforcement device comprising:
a first heater on which the optical-fiber spliced section covered with the protective member is disposed and which heats a central portion of the protective member at a first temperature which is a highest temperature attained by the first heater;
second heaters which are respectively provided on both sides of the first heater along a longitudinal direction of the optical fiber and respectively heat both end portions of the protective member at a first target temperature and at a second target temperature which is higher than the first target temperature, and which is a highest temperature attained by the second heaters; and
a control unit which performs energization control for heating each of the first heater and the second heaters,
wherein the control unit makes an energizing time of the first heater and an energizing time of each of the second heaters at least partially overlap;
wherein the control unit makes the energization of each of the second heaters to be started after the start of the energization of the first heater;

wherein the control unit makes the temperature of each of the second heaters to increase and reach the first target temperature, and after an end of the energization of the first heater, the control units makes the temperature of each of the second heaters to increase and reach the second target temperature;

wherein the first target temperature is lower than the first temperature and the second target temperature is equal to the first temperature.

* * * * *